US005489000A

United States Patent [19]
Hillbohm

[11] Patent Number: 5,489,000
[45] Date of Patent: Feb. 6, 1996

[54] MOTORIZED WHEELBARROW

[76] Inventor: Lars Hillbohm, Örvägen 6, S-814 93 Skutskär, Sweden

[21] Appl. No.: 395,175

[22] Filed: Feb. 27, 1995

Related U.S. Application Data

[63] Continuation of Ser. No. 50,111, filed as PCT/SE91/00725, Oct. 29, 1991, published as WO92/07747, May 14, 1992, abandoned.

[30] Foreign Application Priority Data

Oct. 30, 1990 [SE] Sweden .................................. 9003453

[51] Int. Cl.$^6$ ................................................. B62D 51/04
[52] U.S. Cl. ...................... 180/19.1; 280/47.31; 280/653
[58] Field of Search .......................... 180/13, 19.1, 19.2, 180/19.3; 280/47.31, 47.315, 653, 655, 659

[56] References Cited

U.S. PATENT DOCUMENTS

| | | | |
|---|---|---|---|
| 2,253,288 | 8/1941 | De Lucchi | 180/19.1 |
| 2,742,300 | 4/1956 | Carver | 280/47.31 |
| 2,856,017 | 10/1958 | Overstreet | 280/47.31 |
| 3,791,470 | 2/1974 | Baddore et al. | 180/19.1 |
| 4,427,084 | 1/1984 | Savard, Jr. | 180/19 H |
| 4,705,280 | 11/1987 | Burns | 280/655 |
| 5,026,079 | 6/1991 | Donze et al. | 280/47.315 |

FOREIGN PATENT DOCUMENTS

| | | | |
|---|---|---|---|
| 0045283 | 2/1974 | Australia | 180/19.1 |
| 389280 | 11/1989 | Austria . | |
| 0218520 | 7/1989 | European Pat. Off. . | |
| 1940445 | 3/1971 | Germany | 280/47.31 |
| 3717580 | 12/1988 | Germany | 280/47.315 |
| 4030879 | 4/1991 | Germany | 180/19.1 |
| 8407418 | 8/1985 | Sweden . | |
| 421296 | 12/1989 | Sweden . | |
| 461640 | 3/1990 | Sweden . | |
| 462276 | 5/1990 | Sweden . | |
| 1191347 | 11/1985 | U.S.S.R. | 280/653 |
| 943660 | 12/1963 | United Kingdom | 298/3 |
| 2101050 | 1/1983 | United Kingdom | 280/47.31 |
| 2128559 | 5/1984 | United Kingdom | 180/19.3 |
| 2135249 | 8/1984 | United Kingdom | 280/47.31 |
| 8501259 | 3/1985 | WIPO . | |
| 8501025 | 3/1985 | WIPO . | |
| 8501024 | 3/1985 | WIPO . | |
| 8901892 | 3/1989 | WIPO | 180/19.1 |

OTHER PUBLICATIONS

Fogelsta (Pamphlet).

*Primary Examiner*—Margaret A. Focarino
*Assistant Examiner*—Victor E. Johnson
*Attorney, Agent, or Firm*—Zarley, McKee, Thomte, Voorhees, & Sease

[57] ABSTRACT

A motorized wheelbarrow comprises a pan for receiving a load to be transported by the barrow, at least a wheel arranged to bear on the ground and a motor arranged to rotate the wheel for moving the wheelbarrow over the ground. The motor is located under the pan and with its center of gravity in front of a vertical plane including the axle of rotation of the wheel as seen in the direction of movement in the transport position of the wheelbarrow.

4 Claims, 7 Drawing Sheets

MOTORIZED WHEELBARROW

This is a continuation of U.S. Ser. No. 08/050,111, filed on Apr. 28, 1993, now abandoned, by virtue of International Application PCT/SE91/00725 filed on Oct. 29, 1991 and which designated the U.S.

FIELD OF THE INVENTION AND PRIOR ART

The present invention relates to a motorized wheelbarrow with a pan for receiving a load to be transported by the barrow, at least one wheel arranged to bear on the ground and a motor arranged to rotate the wheel for moving the wheelbarrow over the ground, said motor being arranged under the pan.

Motorized wheelbarrows of this type are already known and are used primarily on rough ground, such as in mountain regions, where a tractor or similar vehicle has difficulties to—or impossibly may—move ahead and different types of building work has to be carried out. However, motorized wheelbarrows may be used for transporting goods in all conceivable situations, in which the person handling the wheelbarrow for any reason, such as for example lack of physical strength, wishes to have motor assistance for moving the wheelbarrow.

Motorized wheelbarrows are already known by for instance SE published patent application 7904333-7 as well as the pamphlet concerning "motorskottkärra" published by the company Fogelsta Industri AB. In these two motor driven wheelbarrows already known the motor is arranged at a substantial distance behind the respective wheel axle as seen in the direction of movement of the wheelbarrow, which considerably restricts the possibilities to design the rest of the wheelbarrow. The weight of the motor and the torque exerted thereof with respect to the wheel axle makes it necessary to provide the wheelbarrow in question with some kind of support wheels which bear on the ground in the region of the motor. This permanent necessity of support wheels may be a considerable disadvantage on rough ground, on which it in the practice probably will be so that the driver of the wheelbarrow has to carry a great portion of the weight otherwise resting on the support wheels himself.

The moment or torque of the motor with respect to the wheel axle also makes it heavy to empty the wheelbarrow forwardly by pivoting the pan of the barrel about an axis being substantially parallel to the wheel axle. In addition, the motor is in the way of the body of the person carrying out the tilting, which makes this uncomfortable, not at least considering the exhaust gases created in an internal combustion engine or the risks for burns, oil stains and so on.

It is important that the wheel of the wheelbarrow has a sufficient size so that the wheelbarrow may be moved in a stable way without friction losses being too great. In order to avoid risks for tilting laterally it is at the same time important that the center of gravity of the load resting in the pan is located as low as possible. These two goals as well as the wish to be able to house a load volume being as great as possible in the pan are contradictory to each other. As a consequence of the location of the motor in the motorized wheelbarrows already known the wheel has to be placed further to the rear end as seen in the direction of movement as would be the case without a motor. This leads to that the wheel is placed in the middle under the pan itself, which makes it necessary to restrict the height and thereby the volume of the pan for preventing the center of gravity of the loaded pan from coming so high above the ground that the wheelbarrow gets difficult to handle. It would of course be possible to place the wheel further to the front, but this would lead to that the weight on the rear support wheels will be too heavy and these would tend to penetrate into the ground and slow down the movement of the barrow. It should also be mentioned that it in motorized wheelbarrows is often desirable to utilize the ability of the motor to drive forwardly to carry a bigger amount of load per transport than would have been possible with a wheelbarrow moved by man power.

BRIEF DESCRIPTION OF THE INVENTION

The object of the present invention is to provide a motorized wheelbarrow finding remedy to the inconveniencies mentioned above of the motorized wheelbarrows already known.

This object is according to the invention obtained by locating the motor of a wheelbarrow defined in the introduction with its center of gravity in front of a vertical plane including the axle of rotation of the wheel as seen in the direction of movement in the transport position of the wheelbarrow.

Thanks to this location of the motor it will be possible to move said wheel axle and thereby the wheel forwardly with respect to the pan without producing a great moment or torque in the region behind the wheelbarrow, for instance on the handles thereof or on possibly existing support wheels. This is possible because the motor is utilized as a counter weight with respect to the load contained in the pan, since the former creates a moment with respect to the wheel axle tending counter-balance the moment of the load. The location of the wheel made possible by the invention also results in that it without the problems of great forces on possibly rear support wheels or handles mentioned above may be located to the front under the tilting wall of the pan inclined forwardly-upwardly, so that the bottom of the pan at a given wheel diameter may be moved closer to the ground. This results in its turn in that the pan may be made deeper at a given acceptable height of the center of gravity of the load to be filled into the pan and it by that may include a greater volume than the pan of the motorized wheelbarrows already known.

A further advantage of the location of the motor according to the invention resides in the fact that it facilitates rather than complicates tilting forwardly of the wheelbarrow for emptying thereof and by doing so not in the slightest way is in the way of the driver of the wheelbarrow, who does not risk to hit it either.

According to a preferred embodiment of the invention the wheel and the motor of the wheelbarrow are arranged on a frame being securable with respect to the pan and separable from the pan and the rest of the wheelbarrow. The whole driving unit of the wheelbarrow is then preferably arranged on the frame. This characteristic makes it easy to disassemble the wheelbarrow, so that it requires considerably less volume upon transportation thereof, for instance on a lorry platform, than in the assembled state. This should be particularly important for transports over longer distances, since it is important to optimally utilize the cargo space available at the same time as too much trouble should not be spent on disassembling and assembling work.

Further advantages and preferred features of the invention will appear from the following description and the other dependent claims.

BRIEF DESCRIPTION OF THE DRAWINGS

With reference to the appended drawings, below follows a specific description of preferred embodiments of the wheelbarrow according to the invention cited as examples.

In the drawings.

DETAILED DESCRIPTION OF PREFERRED EMBODIMENTS OF THE INVENTION

Figure 1:
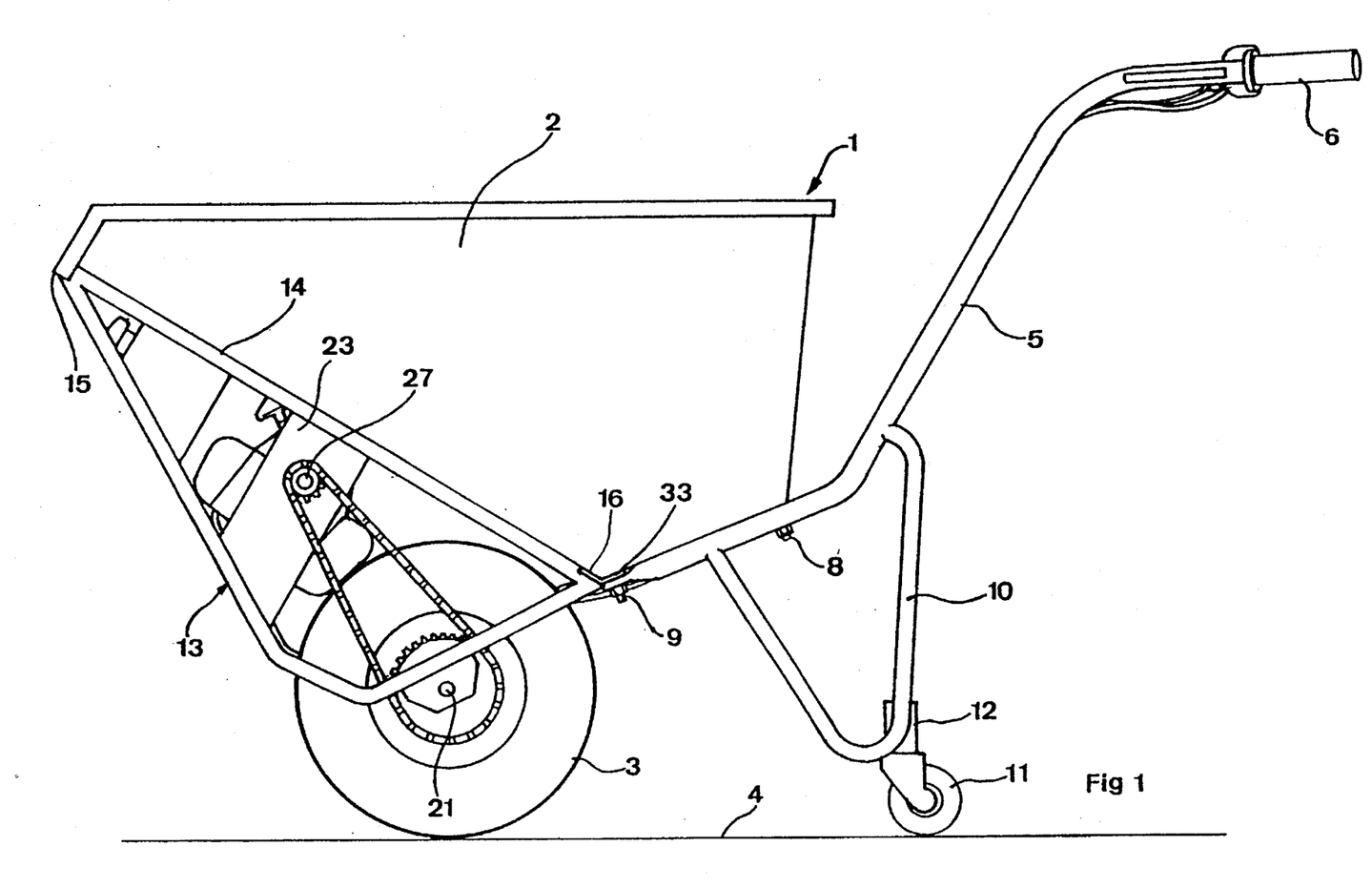
FIG. 1 is a side view of a wheelbarrow according to the invention provided with support wheels in transport position.

A wheelbarrow 1 according to a preferred embodiment of the invention is shown in side view in FIG. 1, said barrow comprising a pan 2 open upwardly for receiving a load to be transported by the barrow, a wheel 3 arranged to bear on the ground or the underlayer 4 as well as two longitudinal members or branches 5 extending rearwardly from the pan and having handles 6 for gripping by a person moving the barrow. It is now also referred to FIG. 2. Each longitudinal member is at two places 7 secured to the pan 2 by means of securing means 8, 9, here screws and nuts. This means that the longitudinal members 5 are separable from the pan and the rest of the wheelbarrow by loosening the securing means 8,9. Each longitudinal member 5 has supporting means 10 projecting downwardly, by means of which the wheelbarrow may rest on the ground 4 when parking it, in the case that no support wheels have been connected to these support means. It is shown in FIG. 1 how a removable support wheel 11 may be secured to the respective support means so as to give the wheel barrow an additional rest on the ground 4 in the transport position shown in FIG. 1. It is then possible that the supporting means 10 are permanently provided with a sleeve 12, in which a support wheel holder may be inserted and fastened should a support wheel be necessary.

Figure 2:
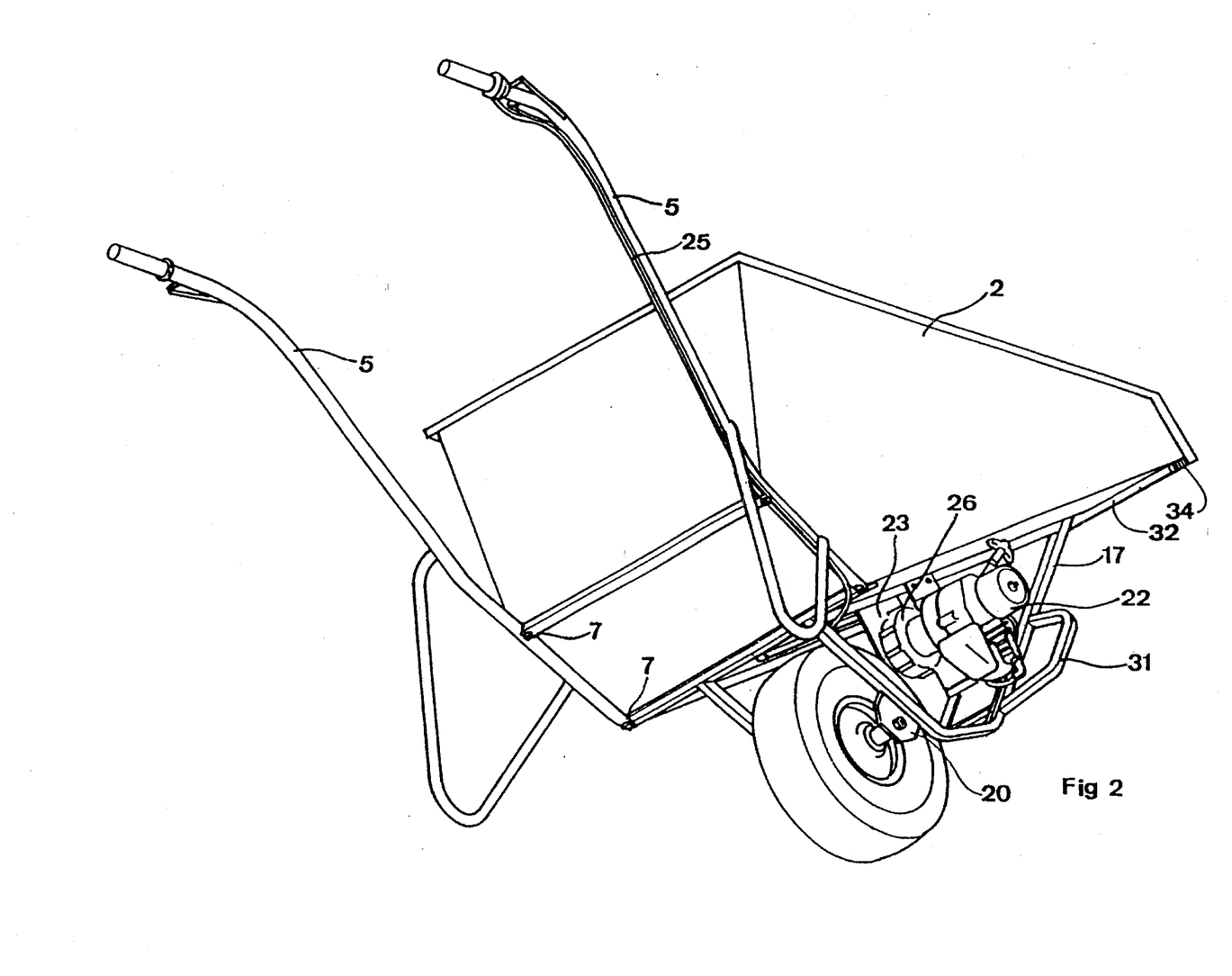
FIG. 2 is a perspective view obliquely from below of the wheelbarrow in FIG. 1, but without support wheels.
Figure 3:
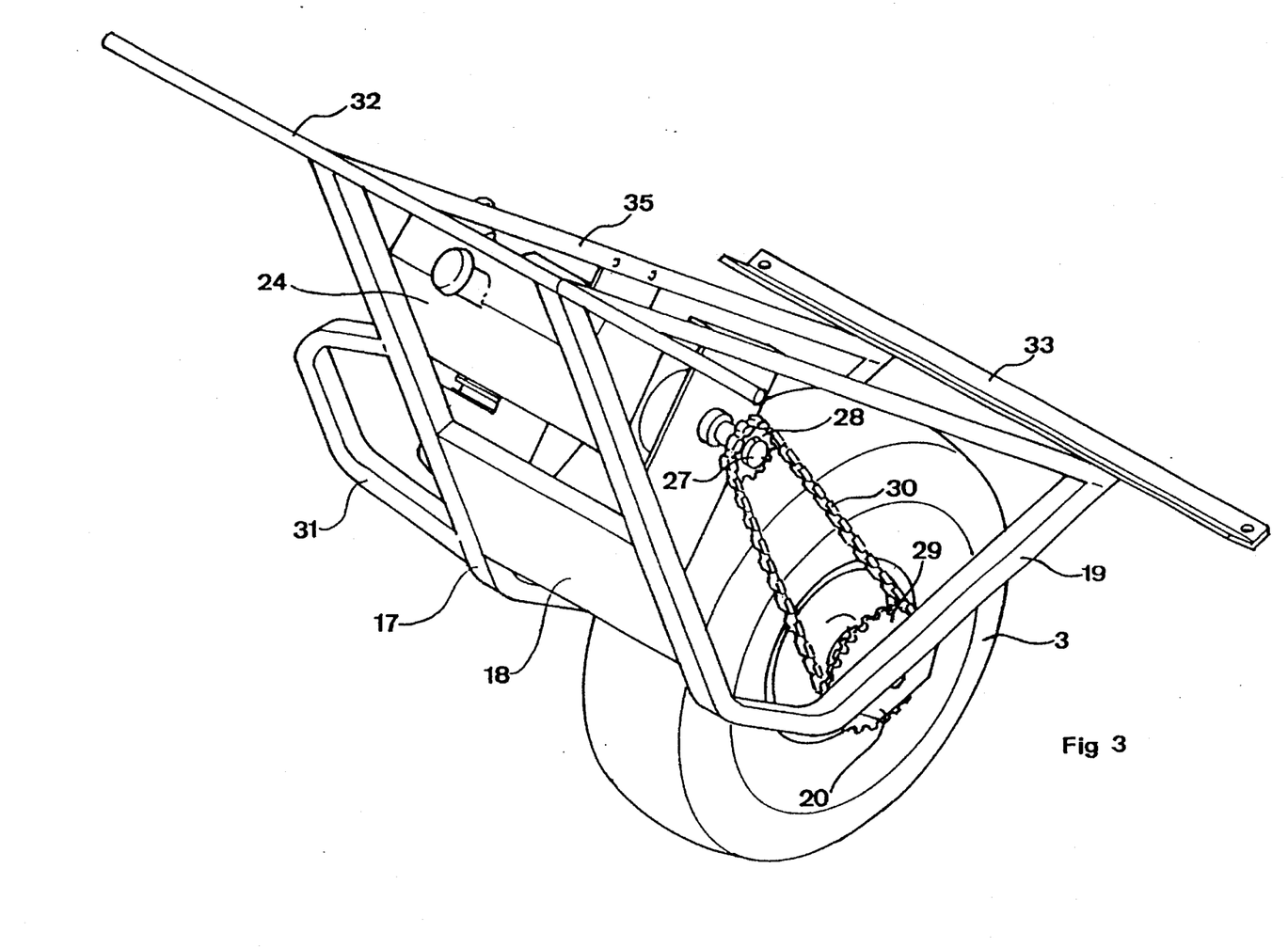
FIG. 3 is a perspective view of the frame with the wheel, the motor and the transmission therebetween of the wheelbarrow according to FIG. 1.

Reference is now parallelly made to FIGS. 1–3. The wheelbarrow comprises a frame 13, which is shown more in detail in FIG. 3. This frame 13 is securable with respect to the pan 2 and separable from the rest of the wheel barrow. The frame has a profile reminding of a right-angled triangle as seen from the lateral side, see FIG. 1, the hypotenuse bearing against the under side of a wall 14 inclining forwardly-upwardly from the bottom of the pan and the two catheters extending downwardly from the front edge 15 of the pan and the rear end 16 of the inclining wall 14, respectively. The frame is constructed by two substantially parallel beam members 17, which are shaped to the triangle-like form mentioned, but there is in the practice no triangle, but a quadrangle, since two bendings have been made for manufacturing reasons at the "right-angled angle" of the triangle, which explains the expression triangle-like. The two beam members 17 are rigidly connected to each other by a plate-like cross bar 18. The wheel 3 is at the lower beam member side 19 through brackets 20 rotatably arranged between the beam members 17 about a substantially horizontal axis of rotation 21. The motor 22 is through other cross bars 23 extending between the beam members 17 secured to the frame 13 in front of and above the wheel axle 21 in the transport position shown in FIG. 1.

The motor 22 is preferably an internal combustion engine with centrifugal clutch and may typically have a power of 1.6 horse powers. The motor is provided with fuel through a fuel tank 24 located between the beam members 17 and which may take for instance 3 liters. A throttle wire 25 extends from the carburator of the motor to one of the handles 6, which functions as a throttle twist-grip. A gear mechanism 26 is arranged at the output shaft of the motor so as to change down the rotation speed, and a gear 28 is arranged at the output shaft 27 of the gear mechanism. A bigger gear 29 than the gear 28 is secured with respect to the wheel axle 21 and a chain 30 is laid around the two gears 28, 29, so that the output shaft 27 by means of the chain 30 rotates the gear 29 and by that the wheel 3 when being rotated. The motor 22 may in this way drive the wheel 3 and by that the wheelbarrow forwardly. The wheel 3 is preferably provided with a free wheel hub, so that the wheelbarrow, in absence of a motor driving force on the gear 29, may be rolled forwardly and backwardly by man power without influencing the chain transmission described and by that making such a movement heavier.

The output shaft 27 of the gear mechanism 26 is arranged in front of and above the wheel axle 21. The position of this output shaft corresponds in side view (FIG. 1) pretty well to the position of the center of gravity of the motor, so that this is in the transport position located at a substantial distance in front of a vertical plane including the wheel axle 21 in the embodiment shown. The wheel may thanks to this circumstance be arranged comparatively far to the front with respect to the pan 2, so that the shortest distance between the bottom of the pan and the ground 4 will be less than the diameter of the wheel in said transport position. The pan may by that be so shaped that it takes a large volume without putting the center of gravity of the pan filled with materials in a location at too great a height above the ground for giving the wheelbarrow a good stability in the lateral direction.

The frame 13 comprises also a beam 31 bent, which serves to protect the motor 22 against driving into obstacles. Furthermore, the entire motor 22 and the tank 24 are arranged behind the beam member parts 17 extending downwardly from the front edge 15 of the wheel barrow, so that these parts protect the vital parts of the motor against driving into obstacles. The frame 13 has also an elongated member, such as a round rod 32, arranged at the front edge of the beam members 17 in the transport position according to FIG. 1, wherein said rod may be a tube and extends substantially parallelly to the wheel axle 21. An elongated angled bar 33 extending substantially parallelly to the round rod 32 is arranged between the beam members 17 at the opposite end of the frame.

Figure 4:
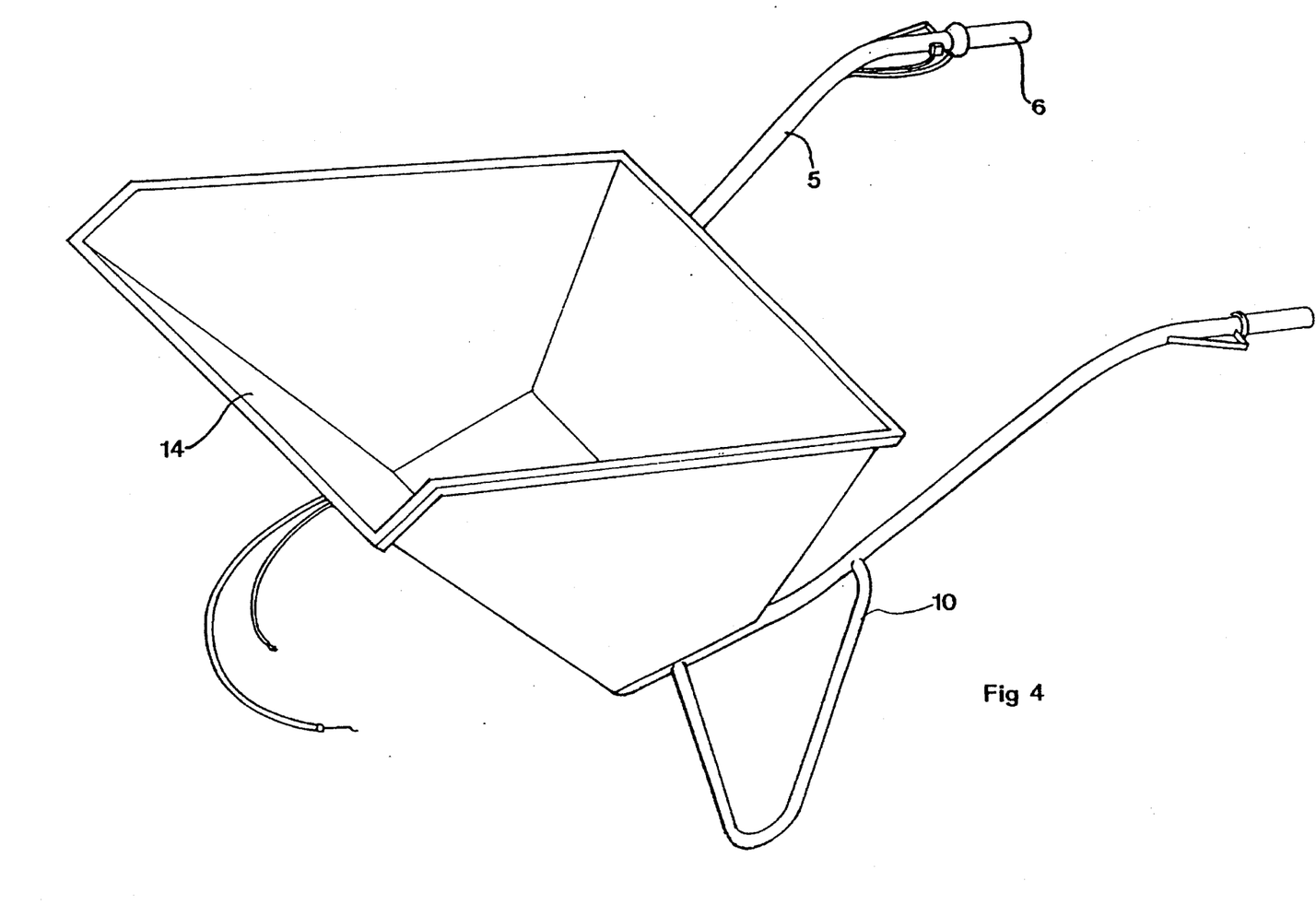
FIG. 4 is a perspective view obliquely from above-from the front of the wheelbarrow in FIG. 1, but without support wheels and the frame shown in FIG. 3.

The frame 13 with the members connected thereto is secured to the rest of the wheelbarrow in the following way: The round rod is first of all introduced into a receiving stop member such as groove 34 directed downwardly-rearwardly in the direction of the inclining wall 14, said groove being located at the front edge 15 of the pan on the underside of the wall 14. The frame is then pivoted about a pivot axis defined by the round rod 32 in a counter-clockwise direction as seen in FIG. 1 while rotating the round rod in the groove 34 until the angled bar 33 comes to bear against the rear end 16 of the wall 14 (see FIG. 1). The securing means 9, i.e. the screws and the nuts, have already been removed from the pan and are after bringing the front end of the longitudinal member 5 under the angle bar passed through the holes in the longitudinal member and the angle bar so as to be secured to the bottom of the pan. The frame is now held fixed to the pan, since the securing of the angle bar prevents the round rod 32 received in the groove 34 from rotating and the beam member parts 32 bear against the underside of the inclining wall 14. A separation of the frame with the wheel and the motor is achieved in the opposite way. It is then also possible to remove the cables going to the motor therefrom, so that the frame may be completely separated from the rest of the wheelbarrow, but these cable connections may also be maintained, should the wish be merely to lay the frame in the pan. Thus, by the fact that the longitudinal members 5 are not connected to the wheel axle 21, which is often the case in conventional wheelbarrows, it is possible to separate the frame carrying the wheel from the rest of the wheelbarrow in a very simple way. The wheelbarrow is in FIG. 4 shown separated from the frame shown in FIG. 3.

Figure 5:
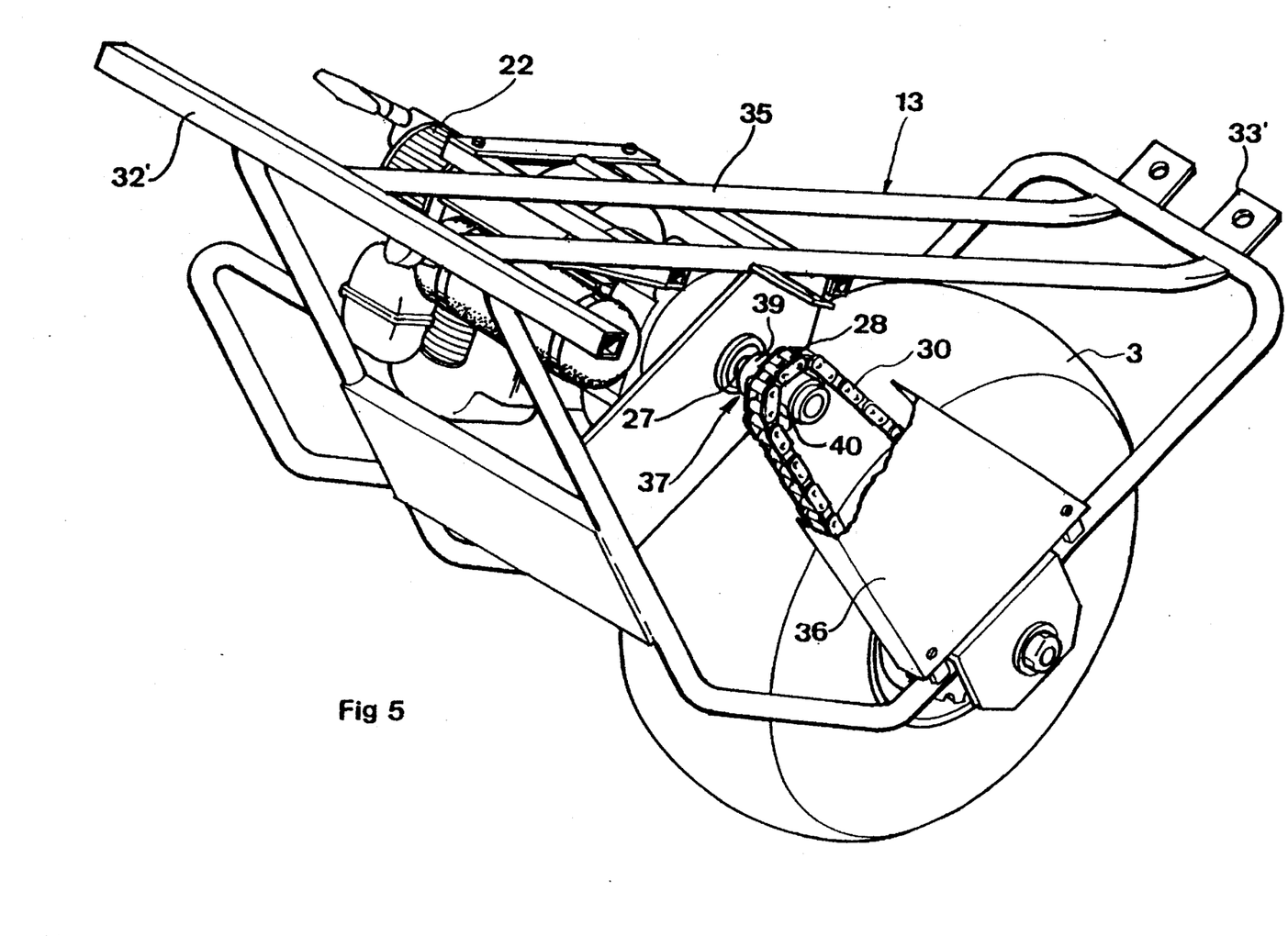
FIG. 5 is a perspective view of the frame with the wheel, the motor and the transmission therebetween of a wheelbarrow according to a second preferred embodiment of the invention.

FIG. 5 is a view being similar to FIG. 3 of the frame with a driving unit of a wheelbarrow according to a second preferred embodiment of the invention. Parts corresponding functionally to parts of the first embodiment have for the sake of simplicity been provided with the same references. Thus, the whole driving unit of the wheelbarrow including the wheel 3, the motor 22, the transmission arranged therebetween with among others the gear 26 and the chain 30 as well as the fuel tank 24 is also in this second embodiment arranged on the frame 13. Besides differences between the two frames 13 with the parts arranged thereon purely related to the appearance there are also some functional differences. A chain shield 36 arranged for the chain 30 is in FIG. 5 partially broken away so as to illustrate a free wheel mechanism 37 being a part of the transmission between the wheel 3 and the motor 22. This is arranged to act between the output shaft 27 from the gear 26 and the wheel 3 itself, so that on moving the wheelbarrow in a first direction, suitably in the normal moving direction of the wheelbarrow, with the motor turned off, there is provided a free rotation of the wheel without any influence on the output shaft 27 through the transmission, and this free wheel mechanism forms a connection rigid to rotation between the output shaft 27 and the rest of the transmission for rotating this shaft in the same direction as the wheel axle on a wheel rotation in the opposite direction. The last mentioned circumstance is of course a condition for that the motor 22 shall be able to rotate the wheel 3 in the normal movement direction of the wheelbarrow when it is turned on. The free wheel mechanism 37 may be constructed in an arbitrary way, but it comprises in the illustrated case a sleeve 39 arranged externally of the output shaft 27 and rigid against rotation with respect thereto, said sleeve being arranged to project into another sleeve 40 secured to the gear 28 in engagement with the chain 30. The inner sleeve 39 secured to the shaft 27 cooperates with the outer sleeve 40 secured to the gear 28, so that a sleeve 40 rotates without carrying the sleeve 39 and the output shaft 27 along in this rotation on rotation of the gear 28 and by that the wheel 3 in the counter-clockwise direction as seen in FIG. 5, while a rotation of the sleeve 40 with respect to the sleeve 39 in the opposite direction is not possible, but on a clockwise rotation of the wheel 3, when the motor is turned off, i.e. moving the wheelbarrow backwards, the outer sleeve 40 and by that the gear 28 will carry the inner sleeve 39 and by that the output shaft 27 along when rotating. Thus, thanks to the free wheel mechanism according to the invention it is possible to easily roll the wheelbarrow forwardly with a small resistance when the motor is turned off, which is an advantage in inter alia the overall handling of the wheelbarrow, such as loading and unloading on vehicles etc.

Furthermore, the elongated member 32 of the frame according to FIG. 3 is in the frame according to FIG. 5 replaced by a hollow square beam 32'. This is just like the round rod arranged to be inserted into the groove 34 at the front edge of the pan, but in this case no rotation thereof takes place. It is instead obtained that the frame is very steadily kept in place by the hollow beam 32' fitting into the groove 34. Furthermore, the angle bar 33 is replaced by two brackets 33' provided with bores and intended to be arranged closer to the central plane of the pan and which are less exposed to damages.

Figure 6:
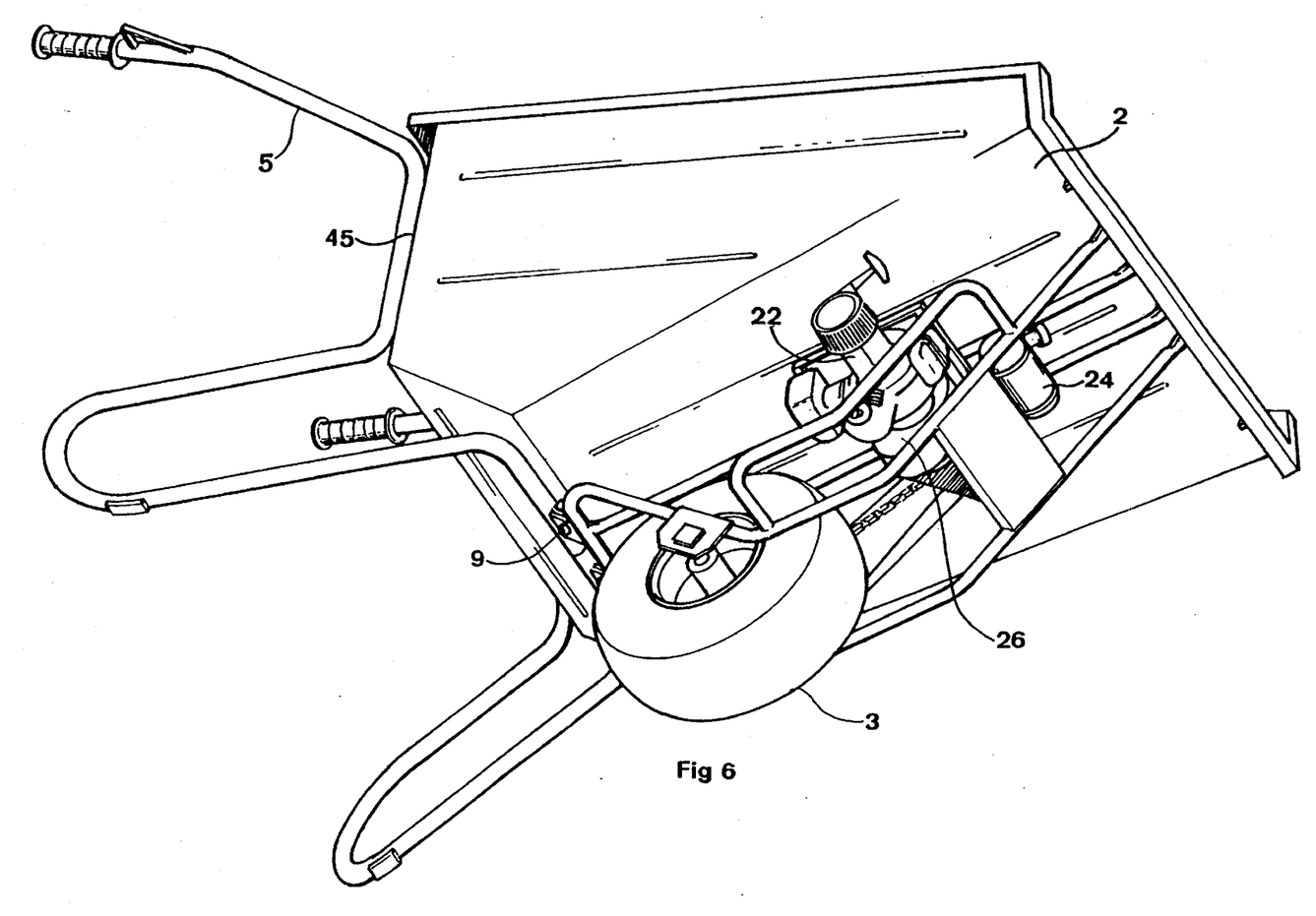
FIG. 6 is a perspective view obliquely from above of a wheelbarrow according to the second preferred embodiment of the invention with the frame according to FIG. 5, and FIGS. 7a and 7b are perspective views of the two branches of the wheelbarrow according to FIG. 6.

It is shown in FIG. 6 how the frame according to FIG. 5 is secured to the underside of the pan 2 of the wheelbarrow according to the second embodiment of the invention. The hollow square beam 32' is pushed into the groove 34 so that the bores of the brackets 33' arrive just in front of threaded bores in the underside of the pan, and screwing means 9 is after that tightened so as to make the securing of the frame to the pan complete. By doing so the branches 5 are at the same time secured to the pan at the same point by inserting the screwing means 9 also through brackets 41 arranged thereon (see FIGS. 7a and 7b).

Figure 7A:
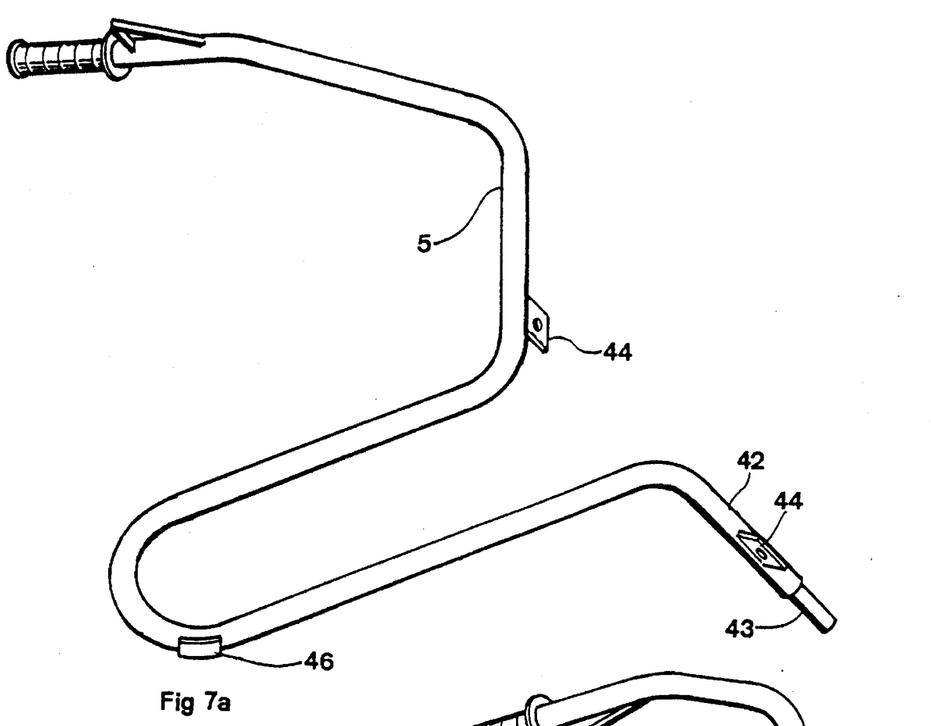
Figure 7B:
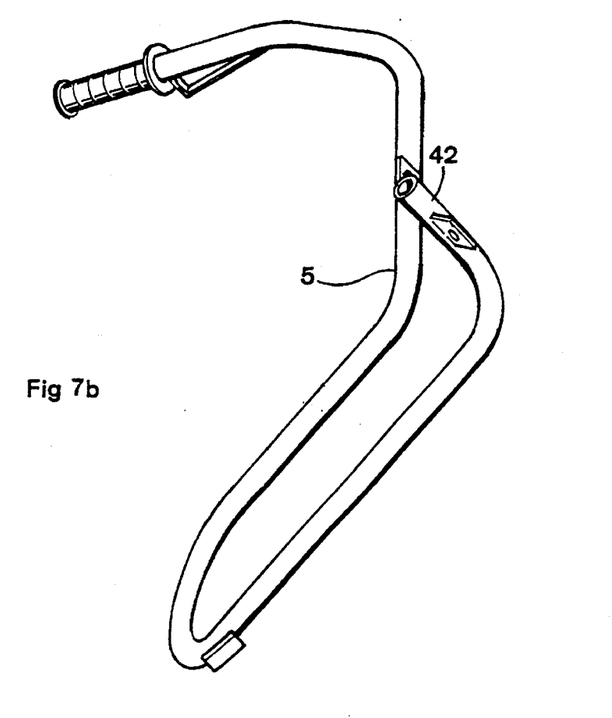

It appears from FIGS. 7a and 7b that the part 42 of one of the branches extending towards the other branch in the state mounted on the pan is arranged to be at least partially telescopically received in the other part of the other branch in this state. This is achieved by the prolongation of one of the branches 5 by an extension 43 with an outer diameter substantially corresponding to the inner diameter of the part 42 of the other branch for being inserted therein. Thanks to the telescopical arrangement of the branches with respect to each other a very high simplicity in securing the branches together with the frame to the pan as well as a particularly excellent durability and stability of the branches in the securing region is obtained. Furthermore, each of the branches has a further bracket 44 for screwing it tight to the rear wall 45 of the pan and special support locks 46 for safer parking of the wheelbarrow, primarily when there is a risk for sliding, such as on inclining ground.

The wheelbarrow according to the invention may be driven in a very stable way thanks to the location according to the invention of the wheel and the motor, which makes the low center of gravity of the pan with respect to its volume possible. This wheelbarrow may substantially increase the efficiency in carrying out different actions, such as building works on rough ground and in certain cases make it possible to carry out a many times higher number of transports per working period than by a wheelbarrow moved by man power. The wheelbarrow according to the invention may be driven comparatively bluntly also on ground with a risk for driving into many obstacles thanks to the motor being protected by the frame and the frame effectively protects the motor against driving into something and be damaged.

The expression "that the diameter of the wheel is larger than the shortest distance between the bottom of the pan and the ground in said transport position" is of course meant to be valid under condition that the wheelbarrow is placed on a plane ground. The axis parallel to the wheel axle about which the tilting of the wheelbarrow takes place on emptying thereof is in the practice mostly the wheel axle itself. The definition "the motor is arranged under the pan" is intended to mean that at least a part of the motor is arranged under the pan, but it is indeed possible that a part thereof projects outwardly past the side or the front of the pan.

The invention is of course not restricted to the preferred embodiments described above, but many possibilities to modifications thereof should be apparent to a man skilled in the art without departing from the basic idea of the invention.

It would be possible for the wheelbarrow to have more than one wheel so as to achieve an increased stability, but this would probably render the maneuverability and the steering of the wheelbarrow more difficult, especially on an uneven ground.

The longitudinal member of the frame could have another cross section than circular or square. The longitudinal member could also be a female member, such as a U-beam, and the stop member could be a male member of a suitable type.

It is not necessary that the motor is an internal combustion engine, but it would also be conceivable to provide the wheelbarrow with an electrical motor and one or more batteries.

The pan, the longitudinal members as well as the frame of the wheelbarrow are preferably made of metal, but other materials, such as hard plastic would also be possible.

I claim:

1. A motorized wheelbarrow for transporting a load, comprising:

a frame having forward and rearward ends;

a pan for receiving the load to be transported, said pan having forward and rearward ends;

at least one wheel mounted on said frame and arranged to bear on the ground;

a motor mounted on said frame and arranged under said pan to rotate said wheel and move the wheelbarrow over the ground;

said frame with both said motor and said wheel mounted thereon constituting a frame assembly and said frame assembly being releasably secured to said pan so as to be separable from said pan as a single integral unit;

at least one longitudinal member having a handle thereon and being mounted to one of said pan and said frame assembly, said longitudinal member being separable from said frame assembly;

said pan having a wall inclining forwardly-upwardly towards a front edge thereof for emptying the load upon tilting the wheelbarrow forwardly about an axis being substantially parallel to said wheel axle, said wheel and said motor being arranged under said wall with the motor along said wall and in front of and above said wheel axle when said wheel is rolled across the ground;

said wall having an underside and said frame being releasably attachable to said underside of said wall of said pan;

said frame having an elongated member at one of said ends and arranged to enter into engagement with a stop member on said pan for stopping forwardly-upwardly displacement of said frame along said wall, said elongated member extending alongside said underside substantially parallel to said wheel axle and adjacent to one of said ends of said pan when said elongated member is engaged with said stop member on said pan, and the end of said frame opposite said elongated member being arranged to be releasably secured by securing means on said underside of said wall of said pan while said elongated member is in engagement with said stop member, and said stop member being arranged to retain said elongated member in engagement therewith when said end of said frame opposite said elongated member is secured to said pan by said securing means.

2. A motorized wheelbarrow for transporting a load, comprising:

a frame having forward and rearward ends;

a pan for receiving the load to be transported, said pan having forward and rearward ends;

at least one wheel mounted on said frame and arranged to bear on the ground;

a motor mounted on said frame and arranged under said pan to rotate said wheel and move the wheelbarrow over the ground;

said frame with both said motor and said wheel mounted thereon constituting a frame assembly and said frame assembly being releasably secured to said pan so as to be separable from said pan as a single integral unit;

said wheel having an axle defining an axis of rotation and said motor having a center of gravity located in front of a vertical plane including the axis of rotation of the wheel;

at least one longitudinal member having a handle thereon and being mounted to one of said pan and said frame assembly, said longitudinal member being separable from said frame assembly;

said pan having a wall inclining forwardly-upwardly towards a front edge thereof for emptying the load upon tilting the wheelbarrow forwardly about an axis being substantially parallel to said wheel axle, said wheel and said motor being arranged under said wall with the motor along said wall and in front of and above said wheel axle when said wheel is rolled across the ground;

said wall having an underside and said frame being releasably attachable to said underside of said wall of said pan;

said frame having an elongated member at one of said ends and arranged to enter into engagement with a stop member on said pan for stopping forwardly-upwardly displacement of said frame along said wall, said elongated member extending alongside said underside substantially parallel to said wheel axle and adjacent to one of said ends of said pan when said elongated member is engaged with said stop member on said pan, and the end of said frame opposite said elongated member being arranged to be releasably secured by securing means on said underside of said wall of said pan while said elongated member is in engagement with said stop member, and said stop member being arranged to retain said elongated member in engagement therewith when said end of said frame opposite said elongated member is secured to said pan by said securing means.

3. A wheelbarrow according to claim 2, wherein said elongated member is a round rod and said stop member is a groove opening obliquely backwardly-downwardly alongside said inclined wall, said groove being arranged to rotatably receive said round rod substantially without clearance, and that said securing means are arranged to secure said opposite end of said frame to said pan after inserting said round rod into said groove and pivoting said opposite end of said frame upwardly about a pivot axis defined by said round rod.

4. A motorized wheelbarrow for transporting a load, comprising:

a frame;

a pan for receiving the load to be transported;

at least one wheel mounted on said frame and arranged to bear on the ground;

a motor mounted on said frame below said pan and arranged to rotate said wheel for moving the wheelbarrow over the ground;

said frame with both said motor and said wheel mounted thereon constituting a frame assembly and said frame assembly being releasably secured to said pan so as to be separable from said pan as a single integral unit;

two longitudinal members each having a handle thereon and being releasably secured to one of said pan and said frame assembly, said longitudinal members being separable from said frame assembly and extending rearwardly from said pan;

each of said longitudinal members having an end portion projecting towards the other of said longitudinal members when said longitudinal members are in a secured state on said pan, and one of said end portions is arranged to be at least partially telescopically received in the other of said end portions in said secured state, such that said longitudinal members are mutually separable on separation thereof from said pan by pulling said one of said end portions out of the other of said end portions.

* * * * *